(12) United States Patent
Miyanaka et al.

(10) Patent No.: US 10,911,722 B2
(45) Date of Patent: Feb. 2, 2021

(54) IMAGE TRANSMISSION APPARATUS, CAMERA SYSTEM, AND IMAGE TRANSMISSION METHOD

(71) Applicant: Panasonic Intellectual Property Management Co., Ltd., Osaka (JP)

(72) Inventors: Ryota Miyanaka, Osaka (JP); Masahiko Yamamoto, Osaka (JP); Kou Watanabe, Osaka (JP); Tsutomu Uenoyama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/274,795

(22) Filed: Feb. 13, 2019

(65) Prior Publication Data

US 2019/0253671 A1 Aug. 15, 2019

Related U.S. Application Data

(60) Provisional application No. 62/631,427, filed on Feb. 15, 2018.

(51) Int. Cl.
*H04N 7/18* (2006.01)
*G06K 9/46* (2006.01)
(Continued)

(52) U.S. Cl.
CPC ............. *H04N 7/181* (2013.01); *B64D 11/00* (2013.01); *G06K 9/00268* (2013.01);
(Continued)

(58) Field of Classification Search
None
See application file for complete search history.

(56) References Cited

U.S. PATENT DOCUMENTS 4,816,828 A 3/1989 Feher
6,771,186 B1 * 8/2004 Boveja ............... B64D 45/0015
340/945

(Continued)

FOREIGN PATENT DOCUMENTS

EP 2 924 663 9/2015
JP 2005-18307 1/2005
(Continued)

OTHER PUBLICATIONS

Extended European Search Report dated Jun. 14, 2019 in European Application No. 19156677.7.

*Primary Examiner* — Christopher G Findley
(74) *Attorney, Agent, or Firm* — Wenderoth, Lind & Ponack, L.L.P.

(57) ABSTRACT

An image transmission apparatus is connected to a plurality of cameras that image the interior of a moving body, and includes a receiver, a processor, and a transmitter. The receiver receives, from an external device of the moving body, an image transmission request and imaging subject information that identifies a passenger to be imaged. The processor selects, based on the imaging subject information, an image captured by at least one camera of the plurality of cameras, and executes processing to remove, from the selected image, other image regions aside from the image region that covers the passenger to be imaged. The transmitter transmits the image that has been processed to the external device.

14 Claims, 12 Drawing Sheets

(51) Int. Cl.
*G06K 9/00* (2006.01)
*B64D 11/00* (2006.01)

(52) U.S. Cl.
CPC ..... *G06K 9/00771* (2013.01); *G06K 9/00832* (2013.01); *G06K 9/00838* (2013.01); *G06K 9/46* (2013.01)

(56) References Cited

U.S. PATENT DOCUMENTS

| | | | | |
|---|---|---|---|---|
| 2004/0117638 | A1* | 6/2004 | Monroe | G07C 9/38 713/186 |
| 2007/0130599 | A1* | 6/2007 | Monroe | G08B 13/19684 725/105 |
| 2014/0195609 | A1 | 7/2014 | Wise | |
| 2017/0113801 | A1* | 4/2017 | Brunaux | B64D 11/00 |
| 2018/0189942 | A1* | 7/2018 | Matsukawa | H04N 7/18 |

FOREIGN PATENT DOCUMENTS

| | | |
|---|---|---|
| JP | WO2017/002240 | 1/2017 |
| WO | 2015/155379 | 10/2015 |

* cited by examiner

IMAGE TRANSMISSION APPARATUS, CAMERA SYSTEM, AND IMAGE TRANSMISSION METHOD

CROSS-REFERENCE TO RELATED APPLICATION

This application claims benefit to U.S. provisional application No. 62/631,427, filed on Feb. 15, 2018. The entire disclosure of U.S. provisional application 62/631,427 is hereby incorporated herein by reference.

BACKGROUND

Technical Field

The present disclosure relates to an image transmission apparatus in a moving body, a camera system, and an image transmission method.

Background Art

There are occasions when a person that requires care such as a child or an elderly person rides a moving body such as an aircraft or a train unaccompanied. In such a case, there is a demand by the family or guardian of the passenger to check on, by image, the state of the passenger from outside the moving body.

While it is possible to use an image captured by a camera disposed in the moving body, doing so may violate the privacy of other passengers. As such, from a practical standpoint, it has been difficult for the family or guardian of a passenger to check on the passenger from outside a moving body.

The present disclosure provides an image transmission apparatus, a camera system, and an image transmission method useful for safely checking on the state of a passenger from outside a moving body.

SUMMARY

The image transmission apparatus according to the present disclosure is connectable to a plurality of cameras that image the interior of a moving body. The image transmission apparatus includes a receiver, a processor, and a transmitter. The receiver receives an image transmission request and imaging subject information that identifies a passenger to be imaged, from an external device of the moving body. The processor selects, based on the imaging subject information, an image captured by at least one camera of the plurality of cameras, and executes processing to remove, from the selected image, other image regions aside from the image region that covers the passenger to be imaged. The transmitter transmits the image that has undergone the processing to the external device.

DETAILED DESCRIPTION

Next, embodiments of the present disclosure will be described with reference to the drawings.

In the following, an example of a case in which the moving body is a commercial aircraft will be described.

Unless otherwise stipulated in each embodiment, as used in the following description, the shape, functions, and the like of the "camera" shall not be construed as being limited, and the term "camera" shall encompass dome, box, movable (pan and tilt), fixed, analog, digital, omnidirectional (360°), wired, wireless, and other types of cameras. The terms "image" and "image signal" shall be construed as encompassing videos and still images.

The phrase "processing to remove image region" shall be construed as encompassing masking the image region. The term "masking" shall be construed as encompassing modifying predetermined values so that the pixel values of the same image region are all a uniform color or subjecting the image region to mosaic or blurring processing.

In the following description, an example is given of a system that basically combines cameras and a separate device (a server or the like), but the present disclosure is not limited thereto and embodiments are possible in which cameras are implemented alone.

1. Embodiment 1

1-1 Overview

Figure 1:
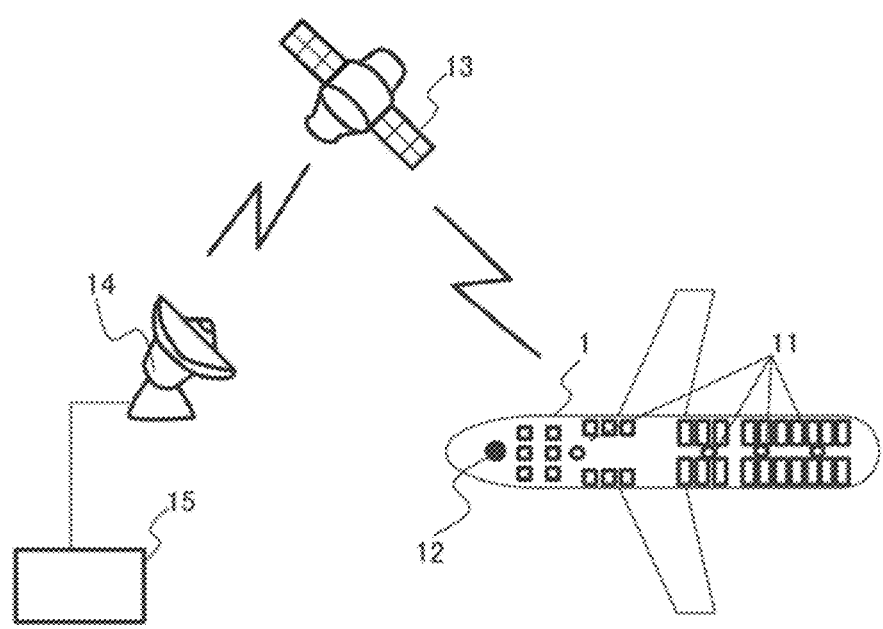
FIG. 1 schematically illustrates the configuration of a communication system that includes a camera system according to Embodiment 1.

As illustrated in FIG. 1, a camera system 11 is installed in an aircraft 1. The camera system 11 is communicably connected to a ground monitoring system 15 via an aircraft wireless device 12 installed in the aircraft 1, a satellite wireless device 13, and a ground wireless device 14.

As described later, the camera system 11 includes a camera 111 and a server 113. The camera system 11 captures images of the interior of the aircraft 1, and outputs the captured images out of the aircraft via the aircraft wireless device 12.

The aircraft wireless device 12 is installed in the aircraft 1 and controls an antenna (not illustrated in the drawings) that enables communication with the satellite wireless device 13, and controls wireless signals for transmitting and receiving. Note that the aircraft wireless device 12 may bypass the satellite wireless device 13 and communicate directly with the ground wireless device 14, such as in air-to-ground communication. The satellite wireless device 13 is a satellite that communicates with the aircraft wireless device 12 and the ground wireless device 14. The ground wireless device 14 is capable of transmitting and receiving various signals to and from the satellite wireless device 13, and is connected to the ground monitoring system 15.

In one example, the ground monitoring system 15 includes a server owned by an airline company and devices owned by passengers and family members of the passengers that use the airline company. A passenger and/or family member of the passenger sends a confirmation request for an in-flight image for a specific aircraft (reserved aircraft or aircraft that the passenger is riding on) to the server from a device such as a smartphone or tablet. The server receives the image transmission request from the device and transmits an image transmission request signal to the camera system 11 via each of the ground wireless device 14, the satellite wireless device 13, and the aircraft wireless device 12.

In an overall configuration such as that described above, in response to the request from the ground monitoring system 15 (the image transmission request signal), the camera system 11 transmits images, audio, and the like of the interior of the aircraft from the aircraft wireless device 12 to the ground monitoring system 15 via the satellite wireless device 13 and the ground wireless device 14.

Note that the ground monitoring system 15 can be simultaneously connected to the wireless devices of a plurality of aircraft and, in the present disclosure, the operations and processing of the ground monitoring system 15 can be simultaneously executed for the camera systems of a plurality of aircraft.

Figure 2:
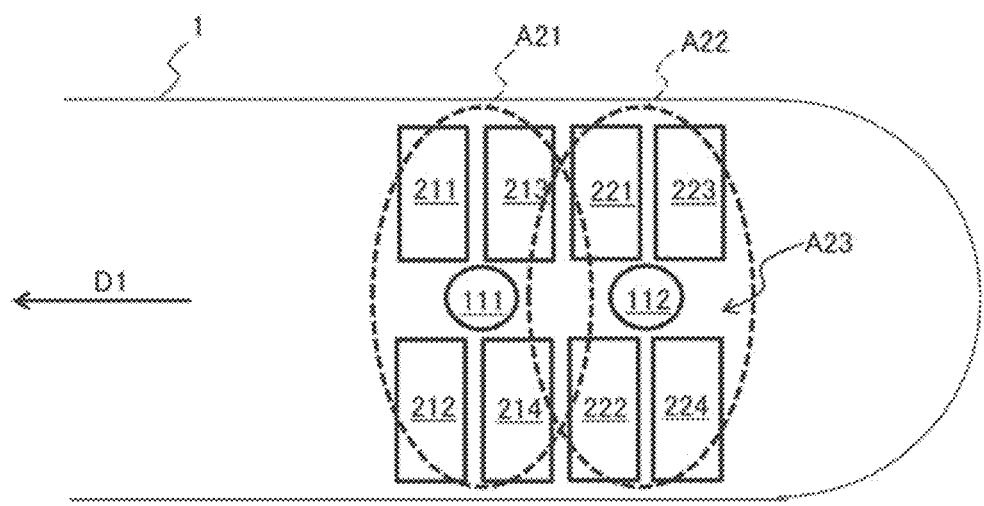
FIG. 2 illustrates relationships, in an aircraft, between seats and imaging ranges of cameras in Embodiment 1.

FIG. 2 illustrates the relationships between seats and imaging ranges of cameras installed in the aircraft 1. In FIG. 2, the aircraft advancing direction D1 of the aircraft 1 is depicted as being in the left paper direction. In the aircraft 1, seats 211, 212, 213, 214, 221, 222, 223, and 224 are arranged from front to back in the aircraft advancing direction D1. Cameras 111 and 112 are installed in the ceiling of an aisle area A23. In this case, the seats 211 to 214 are included in an imaging range A21, which is the imaging range of the camera 111, and the seats 221 to 224 are included in an imaging range A22, which is the imaging range of the camera 112.

Note that the number of seats, the positions of the cameras, and the imaging ranges illustrated in the drawings are merely examples and the present disclosure is not limited thereto.

As illustrated in FIG. 2, in order to transmit the image of a passenger seated in a specific seat, the camera must be selected that has the imaging range that covers the specific seat. For example, in order to transmit the image of the passenger seated in seat 211, the camera 111 that has the imaging range that covers the seat 211 is selected.

1-2 Configuration

Figure 3:
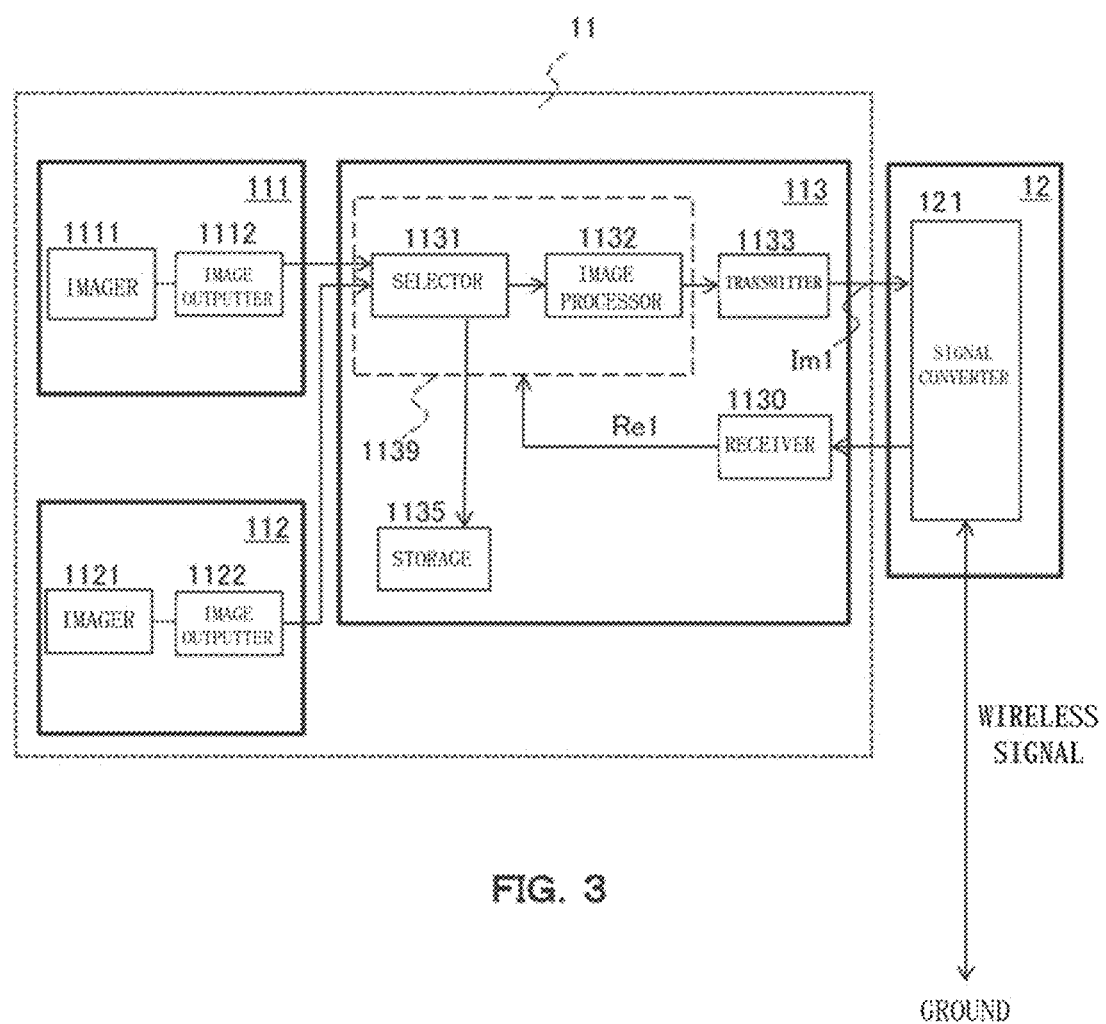
FIG. 3 illustrates the configuration of a camera system according to Embodiment 1.

FIG. 3 illustrates the configuration of the camera system 11. The camera system 11 includes a camera 111, a camera 112, and a server 113 that connects to the cameras 111 and 112. Note that an example of the camera system 11 is described that includes two cameras (the camera 111 and the camera 112). However, configurations are possible in which one camera or three or more cameras are provided.

1-2-1 Camera

The camera 111 includes an imager 1111 and an image outputter 1112. The camera 112 includes an imager 1121 and an image outputter 1122.

The imagers 1111 and 1121 each include a lens and an image sensor. The lens collects light that enters from outside the camera 111 and forms an image on the imaging surface of the image sensor. Examples of the lens include fisheye lenses and wide-angle lenses. The image sensor is, for example, an imaging device of a complementary metal oxide semiconductor (CMOS) or a charged-coupled device (CCD). The image sensor converts the optical image formed on the imaging surface to an electrical signal.

In one example, each of the image outputters 1112 and 1122 includes a central processing unit (CPU), a micro processing unit (MPU), or a digital signal processor (DSP). Data (frames) of the captured image that are recognizable by humans are generated by performing predetermined signal processing using the electrical signals from the imager 1111, and the generated data is output as image signals.

The imager 1111 captures the image of the imaging range A21 illustrated in FIG. 2, and transmits an image signal to the image outputter 1112. Likewise, the imager 1121 captures the image of the imaging range A22, and transmits an image signal to the image outputter 1122.

The image outputter 1112 outputs the image signal, sent from the imager 1111, to the server 113. Likewise, the image outputter 1122 outputs the image signal, sent from the imager 1121, to the server 113.

1-2-2 Server

The server 113 includes a selector 1131, a receiver 1130, an image processor 1132, a transmitter 1133, and a storage 1135.

In one example, the selector 1131 and the image processor 1132 are constituted by a processor 1139 that includes a central processing unit (CPU), a micro processing unit (MPU), a digital signal processor (DSP), or the like. The processor 1139 realizes the functions of the selector 1131 and the image processor 1132 by executing a program that is stored in the memory.

The receiver 1130 receives an image transmission request signal Re1 that is sent from the ground monitoring system 15 via the ground wireless device 14, the satellite wireless device 13, and the aircraft wireless device 12.

The image transmission request signal Re1 includes imaging subject information that identifies the passenger to be imaged. The imaging subject information includes seat information that identifies the seat of the passenger to be imaged, and identification information of the passenger to be imaged (hereinafter referred to as "passenger identifying information").

The imaging subject information may be input in real-time (during travel) from the ground monitoring system 15, or may be received prior to boarding and registered in the storage 1135 or the like.

In one example, the seat information is the seat number. The passenger identifying information is information that identifies the passenger and, for example, is a ticket number, a reservation number, a member registration number for the airline company, a passport number, a password, or the like. From the standpoint of security and to limit the in-flight images that can be checked to those captured on the aircraft 1, when transmitting the image transmission request signal Re1 from the ground monitoring system 15 to the server 113, authentication information known only to the passenger may be simultaneously sent with the identifying information, and authentication processing (described later) may be performed.

The selector 1131 receives the image signals output from the image outputter 1112 of the camera 111 and the image signals output from the image outputter 1122 of the camera 112. The selector 1131 acquires the image transmission request signal Re1 from the receiver 1130. As described later, the selector 1131 selects the image captured by one camera among the plurality of cameras 111 and 112.

A described later, the image processor 1132 executes processing to remove other image regions aside from the image region that covers the passenger to be imaged from the image of the camera 111 or 112 that was selected by the selector 1131.

The transmitter 1133 outputs, to the aircraft wireless device 12, an image signal Im1 of the image processed by the image processor 1132, and transmits the image signal Im1 to the ground monitoring system 15 via the satellite wireless device 13 and the ground wireless device 14.

Figure 5:
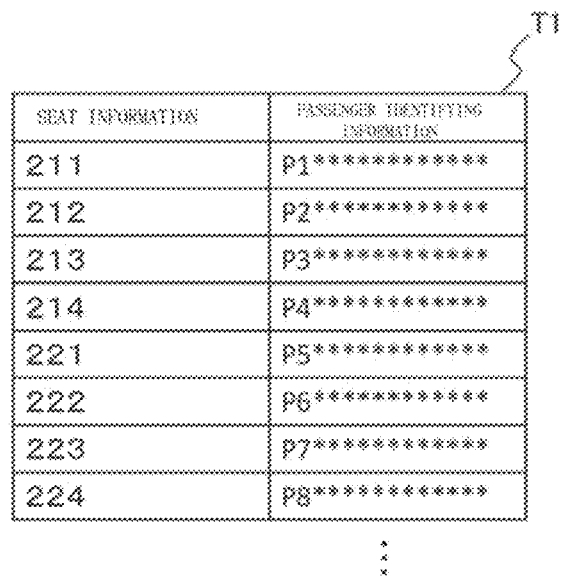
FIG. 5 illustrates an example of an information table for image selection by the server according to Embodiment 1.
Figure 6:
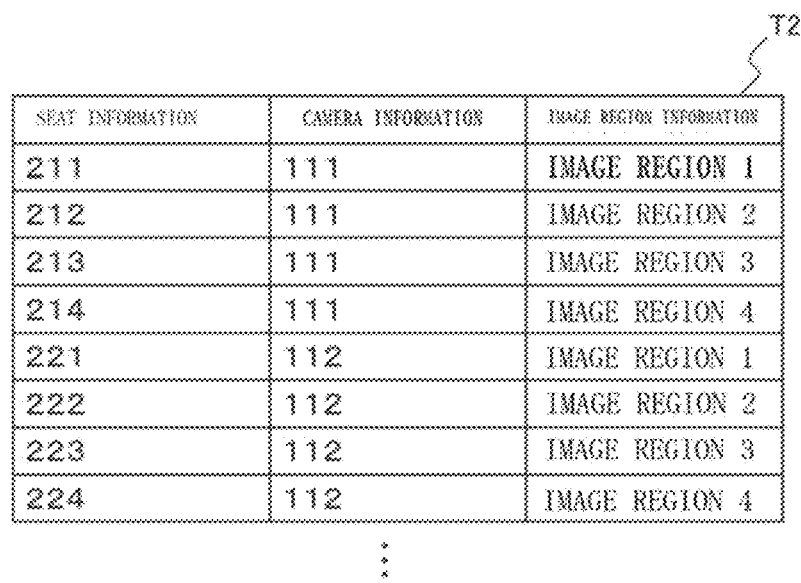
FIG. 6 illustrates an example of an information table for image selection by the server according to Embodiment 1.

The storage 1135 is configured from a semiconductor member, a magnetic disk, or the like. In one example, the storage 1135 stores tables T1 and T2 illustrated in FIGS. 5 and 6. The passenger identifying information (ticket number, reservation number, a member registration number for the airline company, password, or the like) and the seat information (seat number or the like) are associated and stored in the table T1. The seat information, camera information, and image region information are associated and stored in the table T2. The selector 1131 uses these pieces of information for the authentication processing (described later) and for the selection of the camera image.

Figure 7:
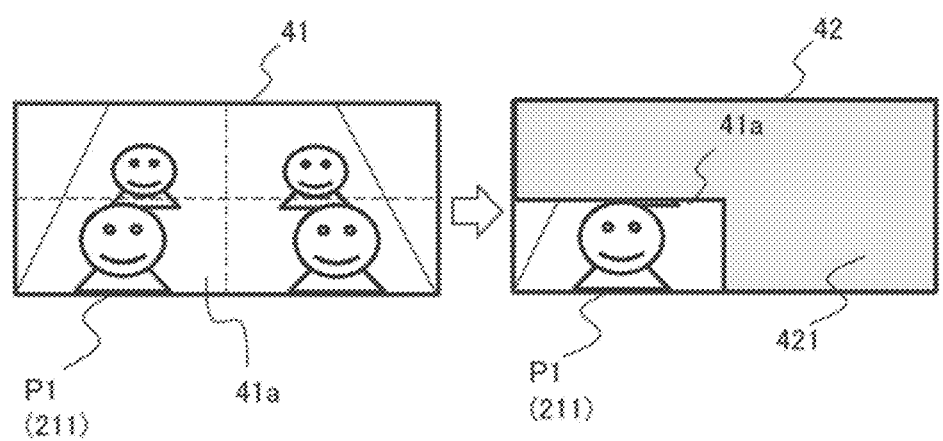
FIG. 7 illustrates an example of image processing by the server according to Embodiment 1.

The camera information is information that identifies the camera that has the imaging range that covers a seat. In this case, each camera has an imaging range that covers a plurality of seats and, therefore, a plurality of seat information is associated with each camera and stored. When the image captured by the one camera has an imaging range that covers a plurality of seats (or passengers), the image region information is information that specifies the image region that covers the position of the seat (or passenger) to be imaged. For example, when, as illustrated in FIG. 2, the imaging range of the camera 111 includes seats 211 to 214 and the requested imaging subject is the seat 211 (passenger P1), image region 41*a* is associated with the seat 211 (passenger P1) and stored, as illustrated in FIG. 7.

The aircraft wireless device 12 that is connected to the camera system 11 includes a signal converter 121. The signal converter 121 converts the image signal Im1 to a wireless signal and outputs the wireless signal. The outputted wireless signal is sent to the ground monitoring system 15 via the satellite wireless device 13 and the ground wireless device 14.

1-3 Operations

The operations of the camera system 11 will be described with reference to FIG. 4.

When the receiver 1130 receives an image transmission request signal Re1 (S101; YES), the server 113 executes the following processing.

Authentication processing is executed by the selector 1131 of the server 113 using the imaging subject information included in the image transmission request signal Re1. In one example, the selector 1131 carries out the authentication processing by comparing the seat information and the passenger identifying information included in the imaging subject information with the seat information and the passenger identifying information of the table T1 of FIG. 5 that is stored in the storage 1135 (S102). When, as a result of the comparison, the identifying information matches (S103; YES), step S104 is executed.

Note that a configuration is possible in which the imaging subject information included in the image transmission request signal Re1 includes only the passenger identifying information. In this case, the imaging subject information is compared with the passenger identifying information of the table T1 of FIG. 5 and, thereafter, the seat of the passenger is identified based on the correspondence relationship with the seat information of table T1.

The selector 1131 identifies the seat of the passenger to be imaged based on the imaging subject information (S104). The selector 1131 references the table T2 stored in the storage 1135 to identify the camera that corresponds to the identified seat (S105), and selects the image captured by that camera (S106).

The selected image is processed by the image processor 1132 (S107). Specifically, the image processor 1132 references the table T2 (FIG. 6) stored in the storage 1135 to acquire the image region information (for example, coordinate values or the like) that corresponds to the seat information of the passenger to be imaged. The image processor 1132 performs processing to remove image regions other than the image region that corresponds to the image region information.

FIG. 7 illustrates an example of the processing carried out by the image processor 1132. Here, an example of a case is described in which the seat specified by the imaging subject information is the seat 211, and the image that includes the passenger P1 seated in the seat 211 is processed. As illustrated in FIG. 2, the seat 211 is covered in the imaging range A21 of the camera 111.

The unprocessed image 41 is an image signal that is input to the image processor 1132 from the image outputter 1112 of the camera 111. The image includes, in addition to the passenger P1 seated in the seat 211, the other passengers seated in the seats 212 to 214 that are covered in the imaging range A21 (FIG. 2) of the camera 111.

Meanwhile, the processed image 42 is an image signal that is output from the image processor 1132. The image processor 1132 performs processing so that the image regions that cover passengers other than the passenger P1 seated in the seat 211 are covered by a privacy mask 421. This processing is performed based on the information of table T2 of FIG. 6. Note that the shape of the privacy mask 421 illustrated in FIG. 7 is an example, and a configuration is possible in which masks are used that cover only the faces of the other passengers.

Additionally, the image processor 1132 may be configured to remove, by facial recognition, the image regions other than the image region that covers the passenger to be imaged. For example, a configuration is possible in which the image processor 1132 acquires feature information of the face of the passenger to be imaged, and performs processing to remove face regions that do not correspond with that feature information.

The processed image is sent, as the image signal Im1, by the transmitter 1133 to the ground monitoring system 15 (S108). If there is an end operation (stop request from the ground monitoring system 15 or the like), the processing is ended.

Meanwhile, when the identifying information does not match and authentication fails in step S103 (S103; NO), the processor 1139 of the server 113 sends a notification, indicating that an image will not be sent, from the transmitter 1133 to the ground monitoring system 15 (S110).

1-4 Features

In the camera system 11 according to the present disclosure, the server 113 as the image transmission apparatus is an apparatus that connects to the plurality of cameras 111 and 112 that image the interior of a moving body, namely the aircraft 1. The server 113 includes the receiver 1130, the processor 1139, and the transmitter 1133. The receiver 1130 receives the image transmission request signal Re1 and the imaging subject information that identifies the passenger to be imaged from the ground monitoring system 15, which is an external device of the aircraft 1. The processor 1139 selects, based on the imaging subject information, an image captured by at least one camera of the plurality of cameras 111 and 112, and executes processing to remove, from the selected image, the other image regions aside from the image region that covers the passenger to be imaged. The transmitter 1133 transmits the processed image to the ground monitoring system 15.

Typically, it is not possible to check on, by image, situations in an aircraft from outside the aircraft 1. However, when, for example, a child or elderly person is unaccompanied, there is a demand by the family of the passenger to check on, by image, the state of the passenger during travel. In this case, it is possible to capture an image of the passenger using a camera that is installed in the aircraft and transmit that image out of the aircraft. However, if that captured image is sent without modification, there is a risk of violating the privacy of the other passengers. Additionally, since, unlike typical monitoring cameras, an image that includes a specific image target is selected from images captured by a plurality of cameras, there is a high risk of transmitting an image of the wrong person.

In the camera system 11 according to the present disclosure, the identifying information and the seat information of the passenger and the characteristics of the images captured by the cameras installed in the aircraft 1 are used. As such, it is possible to safely check on the state of a specific passenger from outside the aircraft while maintaining the privacy of the other passengers in the aircraft.

Additionally, in the camera system 11 according to the present disclosure, when an incident or accident occurs in the aircraft, images, audio, and the like of what occurred on-site at the time of the incident or accident can be recorded in the ground monitoring system 15, and the recorded content can be reviewed after the incident or accident in order to investigate the cause of the incident or accident. Moreover, the images, audio, and the like in the aircraft 1 can be analyzed in real-time and used in a variety of applications.

1-5 Modification Examples (1) A configuration is possible in which the passenger identifying information recorded in advance in the storage 1135 of the server 113 of the camera system 11 and the imaging subject information sent from the ground monitoring system 15 do not include the seat information and, instead, include feature information representing physical features that can be recognized from images, such as facial features.

In this case, when the feature information of the imaging subject is received from the ground monitoring system 15, the processor 1139 of the server 113 determines, based on facial recognition or the like, the appropriate passenger from the images captured by the plurality of cameras. The image captured by the camera that has the imaging range covering the passenger to be imaged may be selected by facial recognition. Additionally, a configuration is possible in which the seat information is acquired by determining the seat information of the passenger that has passed facial recognition based on the selected camera image.

(2) In Embodiment 1, an example is described in which an image captured by a camera installed in the ceiling or the like of the aircraft 1 (hereinafter referred to as "in-aircraft camera") is selected. However, the present disclosure is not limited thereto. For example, a configuration is possible in which an image captured by a camera installed in the monitor of each seat (hereinafter referred to as "seat camera") is selected. In this case, since each seat camera has a positional relationship with each seat on a one-to-one basis, it is easier to identify, in the various images, the image region that covers the passenger to be imaged and the region that is to be subjected to the image processing by the image processor 1132.

Figure 8:
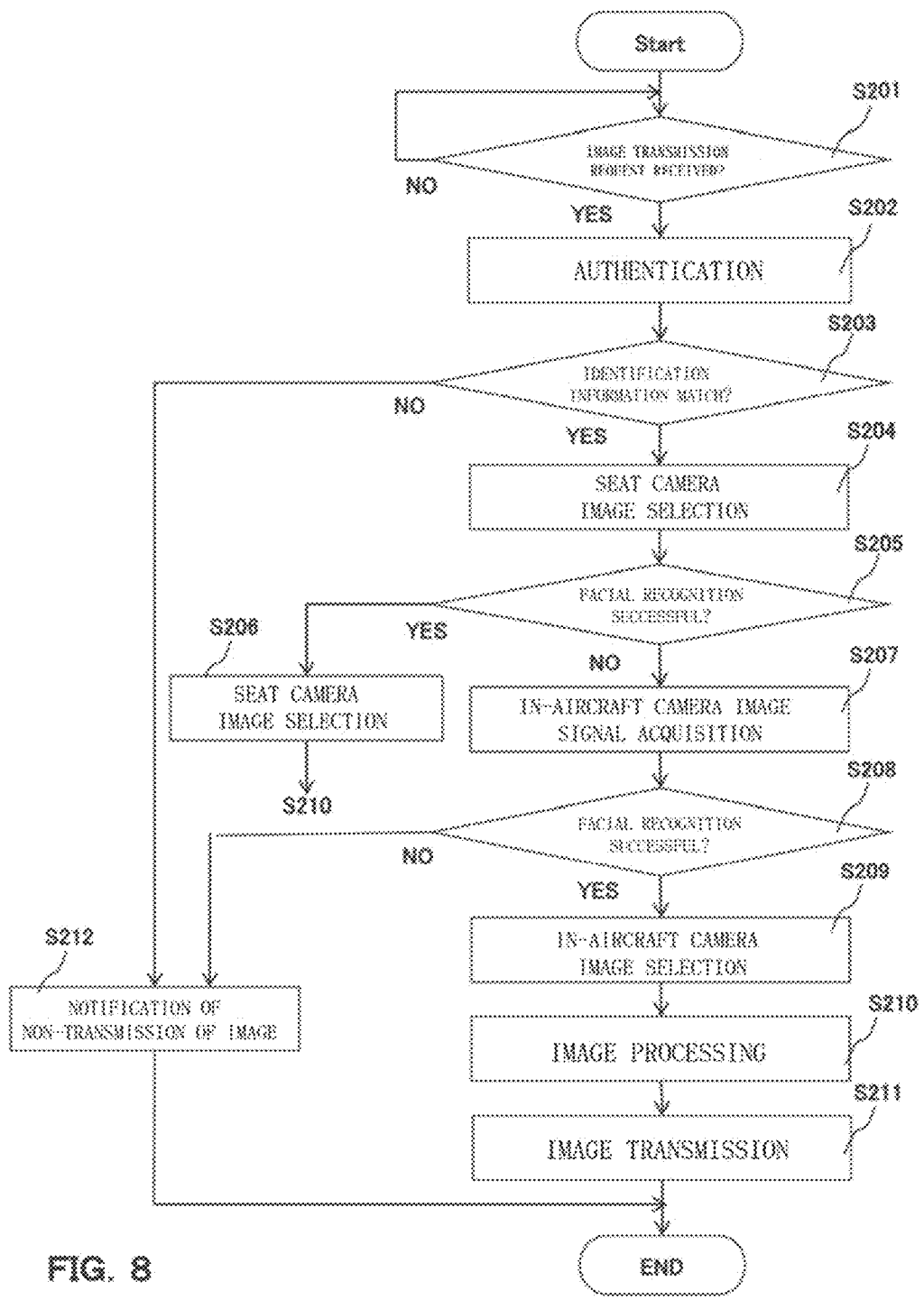
FIG. 8 is a flowchart illustrating the behavior of the server of the camera system according to a modification example of Embodiment 1.

(3) In some cases, in moving bodies such as the aircraft 1, the seats of the passengers may be changed after boarding. In this case, the acquired seat information may not match the actual seat information. In such cases, the image can be selected according to the processing illustrated by the flowchart of FIG. 8.

Figure 4:
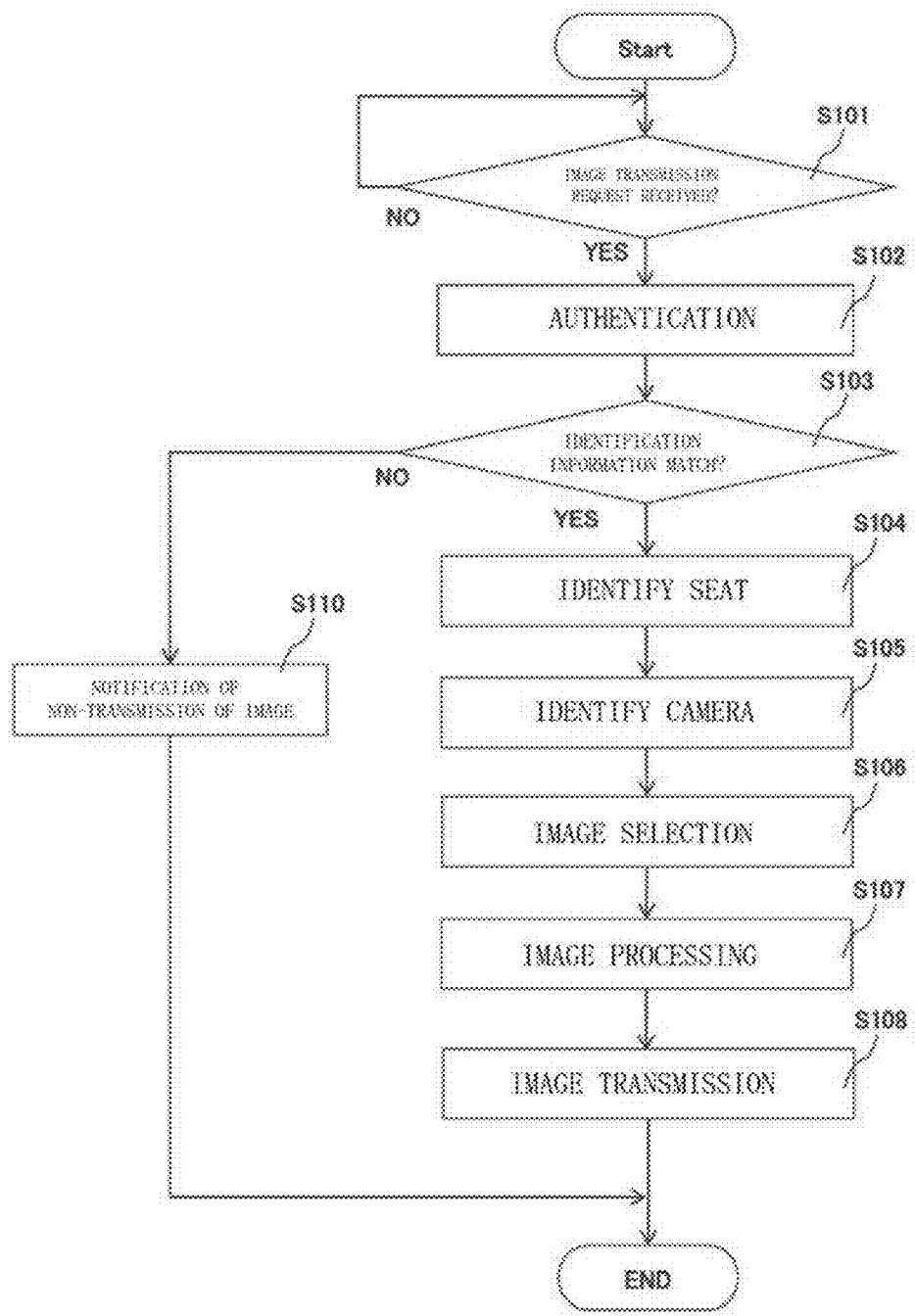
FIG. 4 is a flowchart illustrating the behavior of a server of the camera system according to Embodiment 1.

The server 113 executes steps S201 to S203 in the same manner as steps S101 to S103 of the processing of FIG. 4. The imaging subject information received together with the image transmission request signal Re1 includes feature information that enables facial recognition of the passenger to be imaged. Note that this feature information is not limited to being received together with the image transmission request signal Re1, and may be acquired in advance and stored in the storage 1135 or the like.

The selector 1131 selects, based on the seat information included in the imaging subject information or the seat information stored in the storage 1135, the image captured by the corresponding seat camera (S204). The processor 1139 uses the passenger identifying information to perform facial recognition of the selected image (S205). When the facial recognition is successful, the image captured by that seat camera is selected (S206).

However, when the facial recognition in step S205 fails, the processor 1139 of the server 113 acquires the images captured by the plurality of in-aircraft cameras (S207), and uses the passenger identifying information to perform facial recognition on the images captured by the various in-aircraft cameras that were acquired (S208). When there is an image that passes the facial recognition, the image captured by the in-aircraft camera that output that image is selected (S209).

The selected image is processed by the image processor 1132 in the same manner as described for steps S107 to S108 of FIG. 4 (S210). The image captured by the in-aircraft camera that was selected in step S209 is subjected to processing to remove the image regions other than the image region that covers the passenger for which facial recognition was successful. The processed image is sent, as the image signal Im1, to the ground monitoring system 15 via the transmitter 1133 (S211).

Meanwhile, when the identifying information does not match and authentication fails (S203; NO) or when the facial recognition in step S205 or S208 fails, the processor 1139 sends a notification, indicating that an image will not be sent, to the ground monitoring system 15 via the transmitter 1133.

Note that, if the passenger to be imaged is not included in the image of the seat camera in step 205, this means that the passenger indicated in the seat information of the passenger identifying information and the passenger that is actually seated in that seat do not match. In this case, the processor 1139 of the server 113 may determine the seat information of the passenger for which facial recognition was successful from the selected image of the in-aircraft camera, and correct the seat information held by the server 113.

Moreover, a configuration is possible in which the facial recognition processing is repeated at a predetermined time or a predetermined number of times when the passenger is not present in the seat in steps S205 or S208 (when recognition of a human face is not possible).

(4) With the camera system 11 according to Embodiment 1, the description is focused on transmitting an image signal to the ground monitoring system 15, but the present disclosure is not limited thereto. A configuration is possible in which the microphone is installed in addition to the camera in the aircraft 1. In this case, an audio signal of the passenger seated in the seat specified by the imaging subject information may be acquired by the microphone, the acquired audio signal may be subjected to audio processing, by the processor 1139 of the server 113, to remove the voices of the other passengers, and the processed audio signal may be synchronized with the image signal and sent to the ground monitoring system 15.

(5) A configuration is possible in which the server 113 of the camera system 11 transmits, at a predetermined time, the image signal of the passenger seated in the seat specified by the imaging subject information to the ground monitoring system 15 via the various communication devices (the aircraft wireless device 12, the satellite wireless device 13, the ground wireless device 14, and the like). For example, a configuration is possible in which the processor 1139 transmits an alarm and/or an image signal to the ground monitoring system 15 in accordance with a flight phase (take-off time, landing time, or the like) and/or in-flight services (meal service time, lights on time, and lights off time). In this case, the server 113 may control the transmission time of the image signal by acquiring, from the system in the aircraft 1, flight information, ON/OFF information of lighting, information about crew member announcements, terminal operation information, and the like.

(6) A configuration is possible in which the server 113 of the camera system 11 analyzes the emotional or health state from expressions and/or motions based on the image of the passenger seated in the seat specified by the imaging subject information. In this case, when the processor 1139 determines that the passenger is in a specified condition (the passenger does not move for a set amount of time, or the like), an alarm and/or an image signal may be sent to the ground monitoring system 15 via the various communication devices.

(7) With the camera system 11 according to Embodiment 1, an image captured by one camera was selected for the image transmission request signal Re1, but a configuration is possible in which images captured by a plurality of cameras, which have imaging ranges that cover the passenger to be imaged, are selected and sent to the ground monitoring system 15. With such a configuration, images of the passenger from a plurality of angles can be sent.

Embodiment 2

2-1 Problem

During take-off and landing of the aircraft and when it is necessary to prepare for sudden turbulence, passengers must be seated in the seats to ensure safety. Conventionally, crew members visually determine that passengers are seated by walking back and forth in the narrow aisles of the large aircraft and checking to confirm that each passenger is seated.

2-2 Configuration

Figure 9:
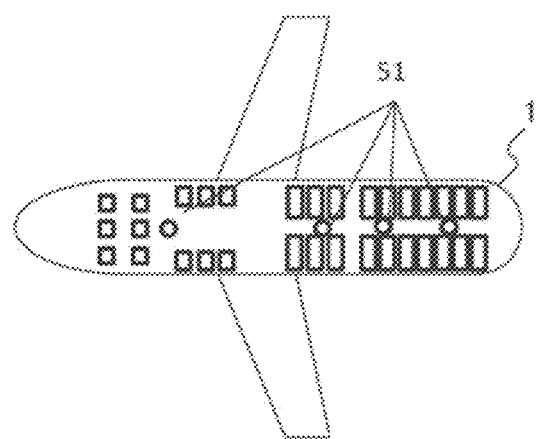
FIG. 9 is a drawing illustrating the arrangement, in an aircraft, of a camera system according to Embodiment 2.

FIG. 9 illustrates the arrangement of a security camera system 51 in the aircraft. Note that the number and disposal locations of the cameras to be installed are examples.

Figure 10:
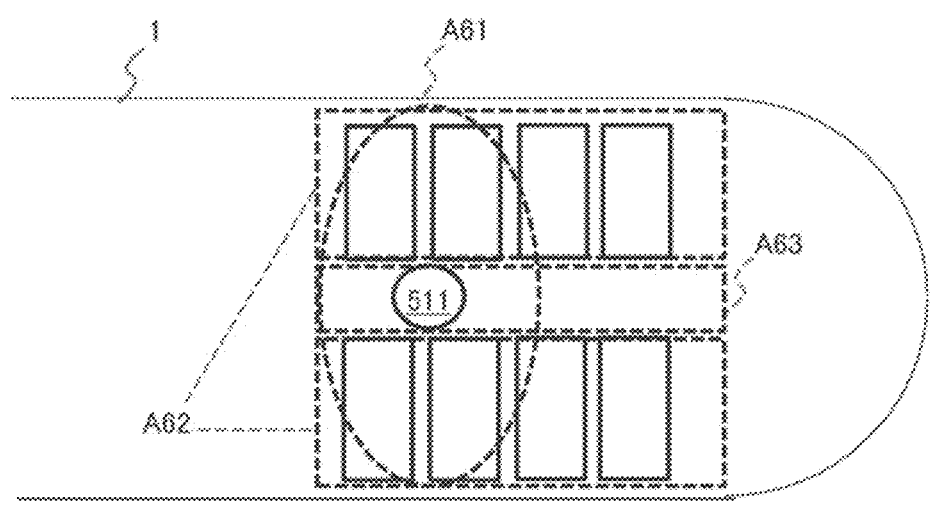
FIG. 10 illustrates relationships, in the aircraft, between areas and the imaging range of a camera in Embodiment 2.

FIG. 10 illustrates an imaging range of a camera to be installed in the aircraft. As illustrated in FIG. 10, the interior of the aircraft is roughly divided into seat areas A62 and an aisle area A63. A camera 511 is installed in the ceiling of the aisle area A63. In this case, the imaging range of the camera 511 is as indicated by an imaging range A61.

Figure 11:
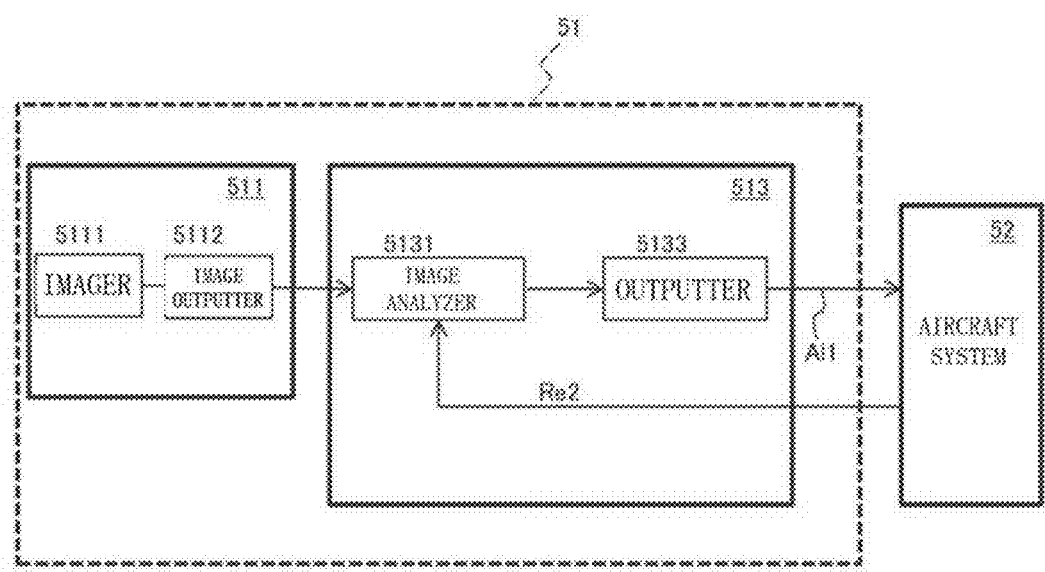
FIG. 11 illustrates the configuration of the camera system according to Embodiment 2.

FIG. 11 is a block diagram illustrating the configurations of a security camera system 51 and an aircraft system 52.

The security camera system 51 includes the camera 511 and a server 513. In this case, an example is described in which one camera is provided, but a configuration is possible in which two or more cameras are provided.

The camera 511 includes an imager 5111 and an image outputter 5112. The operations of the imager 5111 and the image outputter 5112 are the same as those of the imager and the image outputter of Embodiment 1 and, as such, redundant descriptions thereof are avoided.

The server 513 includes an image analyzer 5131 and an outputter 5133.

The image analyzer 5131 receives image signals that are output from the image outputter 5112 of the camera 511. Additionally, the image analyzer 5131 receives sit-down request information Re2 that is issued from the aircraft system 52 when taking off, landing, or when sudden turbulence is expected.

Moreover, upon receipt of the sit-down request information Re2, the image analyzer 5131 analyzes the image signals and determines if there are passengers that are not seated. Then, when there is a passenger that is not seated, the image analyzer 5131 calculates the positional information of the passenger based on an identification number, installation location, and the like of the camera that captured the image of the passenger, and issues a notification, as a not-seated alert Al1, to the aircraft system 52.

Figure 12:
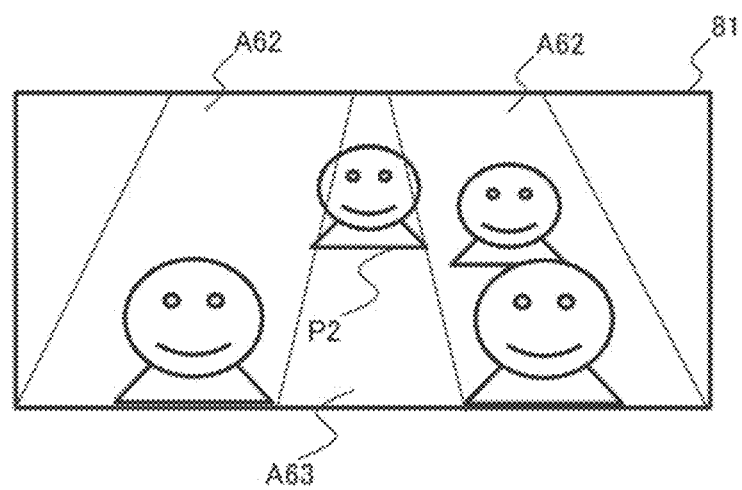
FIG. 12 illustrates an example of an image captured by the camera in Embodiment 2.

FIG. 12 illustrates an example of an image 81 output from the image outputter 5112 of the camera 511. The image analyzer 5131 acquires the image 81, determines the seat areas A62 and the aisle area A63, and analyzes whether a passenger is present in the aisle area A63. In the example illustrated in FIG. 12, since a passenger P2 is present in the aisle area A63, the not-seated alert Al1 is issued via the outputter 5133 to the aircraft system 52, and the crew members are notified.

Note that the image analyzer 5131 can determine if the person present in the aisle area is a passenger or a crew member based on clothing, hair style, movement, or the like. Thus, the generation of not-seated alerts Al1 about crew members can be suppressed.

Note that a configuration is possible in which the image analyzer 5131 executes an analysis of the image signal not only upon receipt of the sit-down request information Re2, but also at a predetermined cycle after the sit-down request information Re2 is received. As a result of this configuration, the content of the not-seated alert Al1 can be updated and notified to the crew members as a time series. For example, it is possible to exclude passengers from the not-seated alerts Al1, who were in the aisle area immediately after the fasten seatbelt sign was turned on (immediately after receipt of sit-down request information Re2) but sat down right away. Additionally, it is possible to identify aisle areas in which passengers are present for an extended amount of time after the fasten seatbelt sign has been turned on, and not-seated alerts Al1 can be updated so as to direct the crew members to those aisle areas with priority.

Furthermore, the image analyzer 5131 may count, in the image signal, the number of people present in an aisle area, and change the priority of the positional information included in the not-seated alert Al1 depending on the number of people. For example, assume that five passengers are present in an aisle area captured by a first camera and one passenger is present in an aisle area captured by a second camera. In this case, the image analyzer 5131 can assign higher priority to the positional information in the aircraft calculated based on the installation location of the first camera than to the positional information in the aircraft calculated based on the installation position of the second camera, include this priority in the not-seated alert A11, and notify the crew members. As a result of this configuration, the crew members can efficiently start guiding passengers to their seats, beginning with the locations where there are more passengers in the aisle areas.

2-3 Advantageous Effects

During take-off and landing of the aircraft and when it is necessary to prepare for sudden turbulence, the seated state of each passenger can be confirmed without the crew members needing to walk back and forth in the aisles, and the workload of the crew members prior to take-off and landing can be lightened.

Other Embodiments

The embodiments described above have been given as examples of the technology that is disclosed in the present application. However, the technology according to the present disclosure is not limited thereto, and changes, substitutions, additions, and omissions can be applied to the embodiments. Moreover, the constituents described in the embodiments may be combined to create new embodiments.

In the embodiments described above, an example is described in which the moving body is an aircraft, but the technology according to the present disclosure is not limited thereto. For example, the technology according to the present disclosure may be installed in a train, a bus, a marine vessel, or other vehicle.

Moreover, the processor 1139 of the server 113 may be implemented by a processor that is constituted by a dedicated electronic circuit that is designed to realize a predetermined function. Examples of such a processor include an FPGA and an ASIC.

Additionally, the program for performing the processing of each functional block of the server 113 may be stored in a storage device such as a hard disk or ROM. In this case, the program is read out to the ROM or RAM to be executed.

The processing of each functional block of the server 113 may be realized by hardware, or may by realized by software (including cases when realized by an operating system (OS) or middleware, or with a predetermined library). Furthermore, the processing of each functional block of the server 113 maybe realized by mixed processing by software and hardware.

Programs and methods that cause a computer to execute the processing of the various functional blocks of the server 113, and computer-readable recording media on which those programs are stored are within the scope of the present disclosure. Examples of computer-readable recording media include flexible disks, hard disks, CD-ROMs, MOs, DVDs, DVD-ROMs, DVD-RAMs, BDs (Blu-ray Disc), and semi-conductor memory. The computer program is not limited to being stored on the recording media described above, and may be acquired over an electric telecommunication line, a wireless or wired communication line, a network such as the Internet, or the like.

Each step described in the flowcharts may be executed by a single device, or may be shared and executed by a plurality of devices. Furthermore, when a single step includes a plurality of processes, the plurality of process of that single step may be executed by a single device, or may be shared and executed by a plurality of devices.

In the present disclosure, the terms "system," apparatus," and "device" refer to collections of pluralities of constituents (devices, modules (parts), and the like), and should not be construed as suggesting that all of the constituents are included in the same housing. Accordingly, the term "system" encompasses a plurality of devices that are stored in separate housings and are connected across a network, and a single device including a single housing and a plurality of modules stored in that housing.

What is claimed:

1. An image transmission apparatus connectable to a plurality of cameras that image an interior of a moving body, the image transmission apparatus comprising:
    a receiver that receives, from an external device of the moving body, an image transmission request and imaging subject information that identifies a passenger to be imaged;
    a processor that performs a facial recognition of the passenger based on the imaging subject information, selects, based on the facial recognition, an image of the passenger that the facial recognition was successful, captured by at least one camera of the plurality of cameras, and executes processing to remove or cover, from the image, image regions except for an image region that includes the passenger that the facial recognition was successful; and
    a transmitter that transmits the image that has been processed to the external device.

2. The image transmission apparatus according to claim 1, wherein
    the imaging subject information includes at least one of seat information that identifies a seat of the passenger to be imaged, and identification information of the passenger to be imaged.

3. The image transmission apparatus according to claim 1, further comprising:
    a storage in which seat information that identifies seats of the moving body and first identification information that identifies a plurality of passengers of the moving body are associated with each other and stored, wherein
    the imaging subject information includes second identification information that identifies the passenger to be imaged,
    the processor determines whether the first identification information and the second identification information match with each other, and
    only when the first identification information and the second identification information match, the processor performs the facial recognition.

4. The image transmission apparatus according to claim 1, further comprising:
    a storage in which seat information that identifies seats of the moving body and camera information for identifying a camera that has an imaging range covering the seat are associated with each other and stored, wherein
    the processor selects, based on the imaging subject information, an image captured by at least one camera that corresponds to the seat information stored in the storage.

5. The image transmission apparatus according to claim 4, wherein
    the storage stores image region information that indicates, among images captured by one camera that has an imaging range including a plurality of the seats, an image region that includes each of the seats, and
    the processor executes processing to remove or cover the image regions from the image based on the image region information.

6. The image transmission apparatus according to claim 1, wherein
    the receiver receives feature information about the passenger to be imaged, and
    the processor selects, based on the feature information, an image captured by at least one camera that has an imaging range including the passenger to be imaged.

7. The image transmission apparatus according to claim 1, wherein
    the plurality of cameras include a first camera that has an imaging range including each seat of the moving body, and a second camera that has an imaging range including a plurality of seats,
    the imaging subject information includes seat information of the moving body, and identification information that indicates a feature of a face of the passenger to be imaged, and
    the processor
        acquires an image captured by the first camera that corresponds to a seat of the seat information,
        determines, based on the identification information, whether the passenger to be imaged is included in the image captured by the first camera,
        when the passenger to be imaged is included in the image captured by the first camera, selects the image captured by the first camera, and
        when the passenger to be imaged is not included in the image captured by the first camera, selects, based on the identification information, an image captured by at least one second camera that has an imaging range including the passenger to be imaged.

8. The image transmission apparatus according to claim 7, wherein
    the processor changes the seat information when the passenger to be imaged is not included in the image captured by the first camera.

9. The image transmission apparatus according to claim 1, wherein
    the moving body is an aircraft, and
    the transmitter transmits the image to the external device in accordance with a flight phase or an in-flight service time of the aircraft.

10. The image transmission apparatus according to claim 1, wherein
    the processor determines, based on the image that is selected, whether an abnormality of the passenger to be imaged exists and, when an abnormality is determined, outputs an alarm.

11. A camera system, comprising:
    the image transmission apparatus according to claim 1; and
    the plurality of cameras disposed in the moving body so as to be connected to the image transmission apparatus.

12. The camera system according to claim 11, wherein the plurality of cameras includes at least one of a first camera that has an imaging range including each seat of the moving body, and a second camera that has an imaging range including a plurality of seats.

13. An image transmission method including, by using an image transmission apparatus connected to a plurality of cameras that image an interior of a moving body,
    receiving an image transmission request from an external device of the moving body,
    performing a facial recognition of the passenger based on the imaging subject information,
    selecting, based on the facial recognition, an image of the passenger that the facial recognition was successful, captured by at least one camera of the plurality of cameras,
    executing processing to remove or cover, from the image, the image regions except for an image region that includes the passenger that the facial recognition was successful, and
    transmitting the image that has been processed to the external device.

14. The image transmission method according to claim 13, wherein
    the imaging subject information includes at least one of seat information that identifies seats of moving body, and identification information of the passenger to be imaged.

* * * * *